Figure 1:
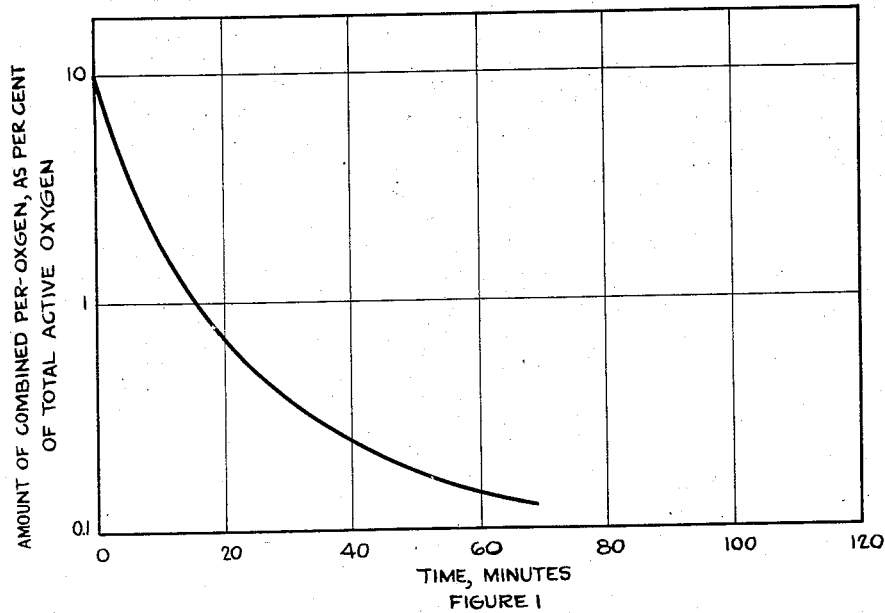

Jan. 20, 1959 W. R. KEELER ET AL 2,869,989
METHOD FOR THE RECOVERY OF HYDROGEN PEROXIDE
Filed April 23, 1952 2 Sheets-Sheet 1

Inventors: W. R. Keeler
D. R. Douslin
C. H. Deal
By: Alan C. Batchelor
Their Agent

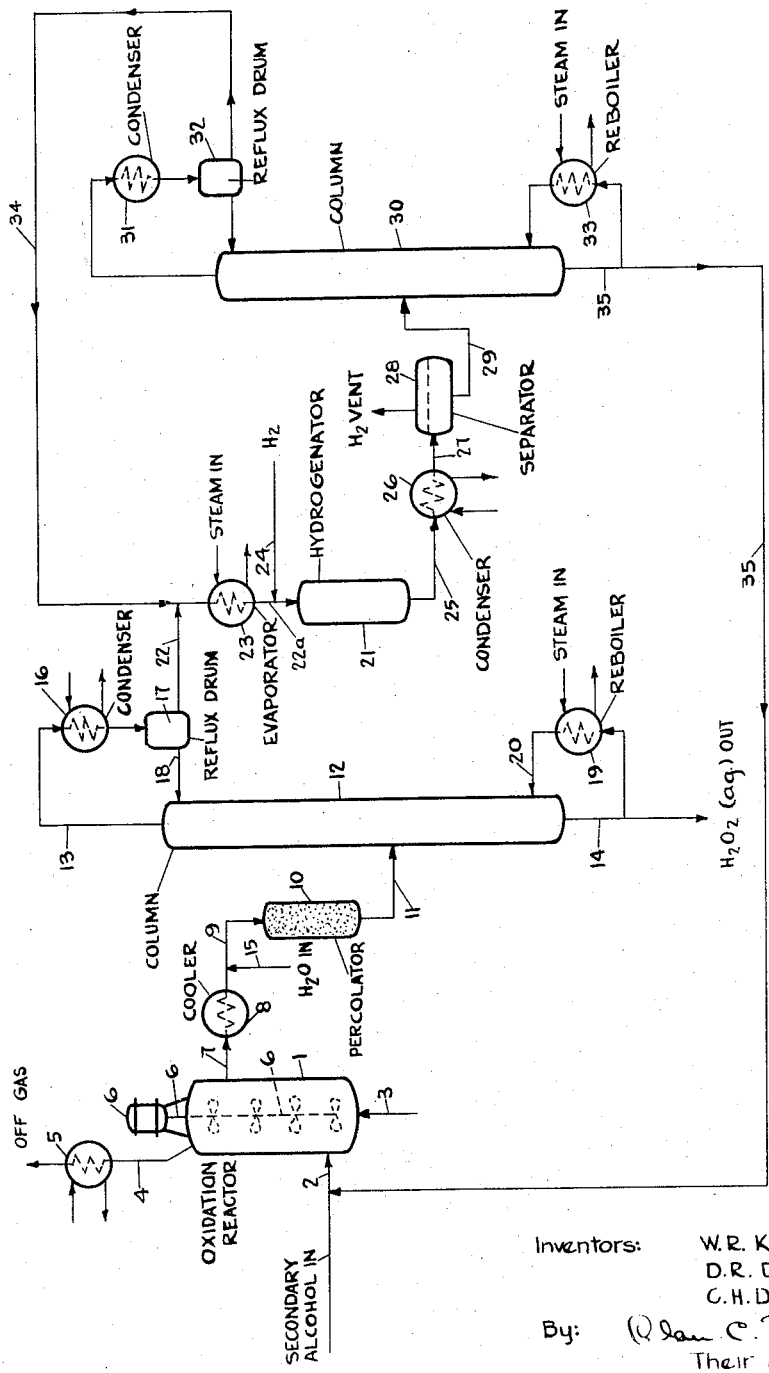

United States Patent Office 2,869,989
Patented Jan. 20, 1959

2,869,989

METHOD FOR THE RECOVERY OF HYDROGEN PEROXIDE

William R. Keeler, Berkeley, Donald R. Douslin, El Cerrito, and Carl H. Deal, Jr., Orinda, Calif., assignors to Shell Development Company, Emeryville, Calif., a corporation of Delaware Application April 23, 1952, Serial No. 283,934

9 Claims. (Cl. 23—207)

This invention relates to a process for the production and recovery of hydrogen peroxide. More particularly, the present invention pertains to a process wherein hydrogen peroxide is produced by partial oxidation of secondary alcohols and is recovered from the oxidation product containing hydrogen peroxide in improved yields and with certain other attendant advantages as hereinafter more fully described.

The conventional processes for commercial production of hydrogen peroxide are the electrolytic process and the barium peroxide process. The electrolytic process comprises electrolyzing an aqueous bisulfate solution to oxidize the bisulfate to persulfate, heating the persulfate-containing solution to liberate hydrogen peroxide by hydrolysis of the persulfate, and distilling hydrogen peroxide and water from the solution of hydrogen peroxide formed by the hydrolysis. In the barium peroxide process, barium peroxide is treated with a strong mineral acid, usually sulfuric acid, to generate hydrogen peroxide, the barium salt formed in the reaction is removed, as by filtration, and the remaining aqueous solution of hydrogen peroxide is distilled. In both of these processes, which involve only inorganic starting materials and intermediates, the aqueous solution of hydrogen peroxide which is obtained as the initial product may be concentrated by distillation. A number of special techniques for the distillation have been developed on the basis of the volatility characteristics of hydrogen peroxide and of water.

There have been proposed in the prior art methods for producing hydrogen peroxide by oxidation of certain organic intermediates, such as 2-ethylanthraquinhydrone, selected azo-substituted aromatic hydrocarbons, normally gaseous saturated hydrocarbons, or the like. In these processes hydrogen peroxide is produced by partial oxidation of the organic intermediate with air or other suitable oxygen-containing gas, in liquid phase or in vapor phase depending upon the particular process under consideration. Hydrogen peroxide is recovered by extracting, scrubbing, washing, quenching, or equivalently treating the crude oxidation products with water, the recovery being achieved by virtue of the solubility of hydrogen peroxide in water and the relative insolubility of the unconsumed organic intermediate in water. There is obtained in this manner a dilute aqueous solution of hydrogen peroxide which may contain organic impurities, the chemical nature of which is determined largely by the particular type of organic starting material used. Thus, when the organic starting material is a normally gaseous saturated hydrocarbon the impurities may comprise organic peroxides resulting from reaction between the hydrogen peroxide and aldehydes which are formed during the oxidation, while with 2-ethylanthraquinhydrone the impurities may comprise the corresponding quinoid compound, solvent, etc. Disclosures of processes for the production of hydrogen peroxide by oxidation of such organic intermediates and for recovery or purification of the hydrogen peroxide present in the dilute aqueous solutions obtained by or from such processes appear in the following patents, among others: U. S. 2,461,988; U. S. 2,533,581; U. S. 2,298,064; U. S. 2,438,252; U. S. 2,376,257.

More recently there has been discovered a certain process for the production of hydrogen peroxide by partial oxidation of secondary alcohols, especially in liquid state. In accordance with this process, a secondary alcohol, advantageously isopropyl alcohol, is aerated in liquid phase with an excess of a molecular oxygen-containing gas in the presence of a peroxidic reaction initiator at elevated temperatures of from about 70° C. to about 160° C., preferably 90° C. to 160° C., while maintaining the liquid reaction mixture scrupulously out of contact with materials which promote decomposition of the hydrogen peroxide produced. As the oxidation of the secondary alcohol is continued hydrogen peroxide is formed and accumulates in the liquid reaction mixture until concentrations of hydrogen peroxide as high as 10% or more up to the limit of safe operations are attained. The liquid oxidation product which is formed in the practice of the process has been found to contain, in addition to the hydrogen peroxide, an approximately equivalent amount (compared to the hydrogen peroxide) of by-product ketone, the unconsumed portion of the secondary alcohol used as starting material, and also small amounts of water-soluble organic products of side reaction. Aldehydes, if present, are present in only negligible, small amounts compared to the amount of hydrogen peroxide and of the ketonic by-product. An illustrative proximate analysis of the oxidation products prepared from isopropyl alcohol is as follows:

| Component: | Percent by weight anhydrous basis |
|---|---|
| Isopropyl alcohol | 67 |
| Acetone (distillation-hydroxylamine method [1]) | 22 |
| Active oxygen,[2] as hydrogen peroxide (sodium iodide-sulfuric acid method [3]) | 9 |
| Aldehydes, as acetaldehyde | <0.05 |
| Other organic impurities, as carbon | 0.01 to 0.10 |

[1] A measured sample is treated with acidic sodium iodide solution to reduce the active oxygen and then distilled into a solution of hydroxylamine hydrochloride. The solution of hydroxylamine hydrochloride then is titrated with base to methyl orange-xylene cyanole end point to determine the amount of acid liberated in the reaction between distilled acetone and the hydroxylamine hydrochloride.
[2] Peroxy (—O—O—) oxygen.
[3] A measured sample is added to a quantity of 30% $H_2SO_4$. Sodium iodide solution (10% w.) is added, the mixture is allowed to stand in the dark for 15 minutes, and then is titrated with standardized sodium thiosulfate solution.

The present invention is based in part upon a discovery by the applicants that the crude oxidation products produced by such partial oxidation of secondary alcohols may contain, in addition to hydrogen peroxide, active oxygen (peroxy oxygen) which is present in a form other than hydrogen peroxide, possibly as organic peroxides. The proportion of the total amount of active oxygen in the crude oxidation product which may be present in the form of this combined per-oxygen, as the active oxygen other than that present in the form of hydrogen peroxide may be referred to in the interest of brevity, may vary over a considerable range depending upon the components initially present in the reaction mixture and the secondary alcohol used as starting material, as well as upon the particular conditions used during the oxidation of the secondary alcohol. The amount of the combined per-oxygen which is present in the crude products that contain combined per-oxygen may range from but a few percent (e. g., 1% to 5% or less) of the total amount of active oxygen in the crude oxidation product, to as much as 25%, 35%, or even 50% of the total amount of active oxygen.

The combined per-oxygen which may be present in the crude products has been found by the applicants to be in a form or type of chemical combination which is substantially non-reactive with, i. e., is essentially inert with respect to, calcium hydroxide. It, therefore, is present in a form which is distinctly different from and is not to be confused with the oxyalkyl hydroperoxides and dioxyalkyl peroxides known to be present, for example, in the crude products of partial oxidation of normally gaseous saturated hydrocarbons, such as propane. See, for example, U. S. Patent No. 2,461,988, to Kooijman. This distinction is shown by the following experiments:

Isopropyl alcohol-water constant-boiling mixture (ca. 12% w. of water) containing about 2% by weight of added hydrogen peroxide as reaction initiator and about 25 p. p. m. of added sodium pyrophosphate decahydrate is aerated in liquid phase with gaseous oxygen at 125° C. under 115 p. s. i. g. pressure to produce a crude product containing, on an anhydrous basis, about 9% w. of active oxygen (sodium iodide-sulfuric acid method), about 22% w. acetone (distillation-hydroxylamine method), and about 67% isopropyl alcohol. A sample of the crude product thus obtained, containing about 3.5 grams of total active oxygen, was diluted to 100 ml. with 1% w. aqueous sodium pyrophosphate solution. The resulting solution was added with rapid stirring over a period of about 5 minutes to a 10% excess of an aqueous slurry of lime (about 9.25 gms. Ca(OH)$_2$ per 100 gms. of slurry) at 10° C. After an additional 15 minutes reaction time the resulting slurry was filtered rapidly and the filtrate analyzed for total active oxygen. About 27% of the active oxygen initially present in the crude oxidation product was found in the filtrate and, therefore, was shown to have been present in a form non-reactive with the lime.

In the second experiment propane is oxidized in the vapor phase according to the disclosures of the Lacomble patent, U. S. 2,376,257 to produce a condensed crude aqueous product containing about 3.5% by weight of active oxygen (expressed as hydrogen peroxide), about 30% of the active oxygen being organic peroxide (oxyalkyl hydroperoxides and dioxyalkyl peroxides) and about 70% being hydrogen peroxide. The crude product was treated with an aqueous slurry of lime under the identical conditions used in the preceding experiment. The yield of precipitated calcium peroxide octahydrate was about 96.6% of theory based upon the total active oxygen contained in the crude product. The remaining 3.4% of the active oxygen was accounted for by decomposition and handling losses.

The chemical form in which the combined per-oxygen is present in the crude products of the partial oxidation of secondary alcohols has not been fully ascertained. It has been indicated that organic peroxides, and in particular polymeric organic peroxides, are present in the crude oxidation products which contain combined per-oxygen. It is possible that ketone peroxides and in particular polymeric ketone peroxides are present. Aldehydes, if formed at all in the above-mentioned processes for partial oxidation of lower aliphatic secondary alcohols to produce hydrogen peroxide, peroxy compounds formed therefrom, are present in amounts entirely inadequate to account for the amounts of combined per-oxygen which may be encountered in the crude oxidation products.

The presence of combined per-oxygen in the crude oxidation products of lower secondary alcohols has been found to lead to certain difficulties. These include:

(1) The volatility characteristics of the combined per-oxygen are such that, when unconsumed secondary alcohol and by-product ketone are distilled from the crude oxidation products containing combined per-oxygen by the distillatory methods heretofore employed, combined per-oxygen tends to distill therewith. This volatile combined per-oxygen, even though volatilizing in but small amounts, tends to deactivate or poison hydrogenation catalysts. Therefore, when it is desired to reconvert the by-product ketone by hydrogenation to the secondary alcohol used as starting material, purification, e. g., fractionation, of the distillate fraction containing the by-product ketone prior to hydrogenation heretofore has been required for efficient operation of the hydrogenation step.

(2) Less volatile combined per-oxygen, which heretofore has remained in the aqueous solution of hydrogen peroxide obtained as the still residue or bottoms product from the distillation, is non-reactive to lime under the conditions useful for recovery of the hydrogen peroxide by precipitation as calcium peroxide. When the hydrogen peroxide contained in the still residue is to be converted to calcium peroxide by reaction with calcium hydroxide a substantial loss of the total active oxygen, therefore, results.

(3) The less-volatile combined per-oxygen contains carbon. Its presence greatly complicates subsequent purification and/or concentration of the hydrogen peroxide by techniques involving vaporization. This is in part owing to the great dangers of explosion or other violent reaction between hydrogen peroxide in relatively concentrated form and organic materials and in part because the volatility characteristics of the less volatile combined per-oxygen makes its separation from the aqueous solution of hydrogen peroxide very difficult to accomplish.

(4) The combined per-oxygen, to the extent that it comprises ketone peroxides and polymeric ketone peroxides, represents a loss of ketone which ketone otherwise could be reconverted to the secondary alcohol and recycled.

A principal object of this invention is an improved method for recovery of hydrogen peroxide from crude products of oxidation of lower secondary aliphatic alcohols containing hydrogen peroxide.

Further important objects of the invention include a method for recovery of hydrogen peroxide from crude oxidation products of lower secondary aliphatic alcohols containing hydrogen peroxide and combined per-oxygen whereby the combined per-oxygen as well as the hydrogen peroxide is made available for ultimate recovery as hydrogen peroxide, and a method for converting the combined per-oxygen to per-oxygen recoverable as hydrogen peroxide.

A further object is a method whereby there can be obtained higher yields of hydrogen peroxide than heretofore from the active oxygen in crude oxidation products of lower secondary aliphatic alcohols containing active oxygen.

An efficient continuous method for recovering hydrogen peroxide from crude oxidation products of lower secondary aliphatic alcohols form yet another object of the invention. Other objects of the invention will be evident from the disclosures of the invention herein.

It now has been discovered in accordance wtih this invention that the combined per-oxygen contained in the hereinbefore and hereinafter described crude products of partial oxidation of lower secondary alcohols containing the same and hydrogen perioxide can be selectively decomposed, without material decomposition of hydrogen peroxide. It has been further discovered that by effecting such selective decomposition of the combined per-oxygen in accordance with the method of the present invention there can be produced a substantial amount of hydrogen peroxide, which amount is additional to the amount initially present in the crude oxidation product. It further has been discovered that unconsumed secondary alcohol and by-product ketone can be separated from the crude oxidation product simultaneously with the selective decomposition of the combined per-oxygen in the crude oxidation product to leave an aqueous solution containing hydrogen peroxide in greatly improved yields based upon the total amount of active oxygen initially contained in the crude oxidation product. By reference to selective decomposition of the combined per-oxygen, it is meant that of the total active oxygen in the oxidation product containing combined per-oxygen, substantially only the combined per-oxygen is converted and that that is converted to hydrogen peroxide. In accordance with with this invention, there are obtained substantially increased yields of hydrogen peroxide, based upon the total content of active oxygen in such crude oxidation products containing combined per-oxygen, and materially increased recoveries of by-product ketone, and subsequent operations directed to recovery, purification and concentration of the hydrogen peroxide are greatly facilitated.

Broadly stated, the method of this invention comprises subjecting the crude oxidation product of the lower secondary aliphatic alcohol containing hydrogen peroxide and combined per-oxygen to a controlled heat-treatment and to a continuous rectification in a fractionating column under controlled conditions of column operation and rate of throughput of the feed to the column. According to a preferred aspect of the invention, the heat-treatment and the rectification are carried out concurrently, or simultaneously, in a rectification zone whereby in the one operation selective decomposition of the combined per-oxygen to hydrogen peroxide and recovery of unconsumed alcohol, by-product ketone and an aqueous solution of hydrogen peroxide are achieved.

The invention may be more fully explained by reference to Figures 1 and 2 of the drawings which form a part of the present specifications.

Fig. 1 is a graph which describes the observed conversion of combined per-oxygen upon heating of a crude oxidation product of a lower secondary aliphatic alcohol containing the same and hydrogen peroxide. The curve describes data obtained by heating at 100° C. a crude oxidation product prepared by oxidation of isopropyl alcohol in liquid phase according to the process referred to hereinbefore, the product containing about 10% of the total active oxygen as combined per-oxygen, and periodically withdrawing aliquots of the product during the heating and analyzing the aliquots for combined per-oxygen according to the calcium hydroxide method dscribed hereinbefore.

Figure 2:
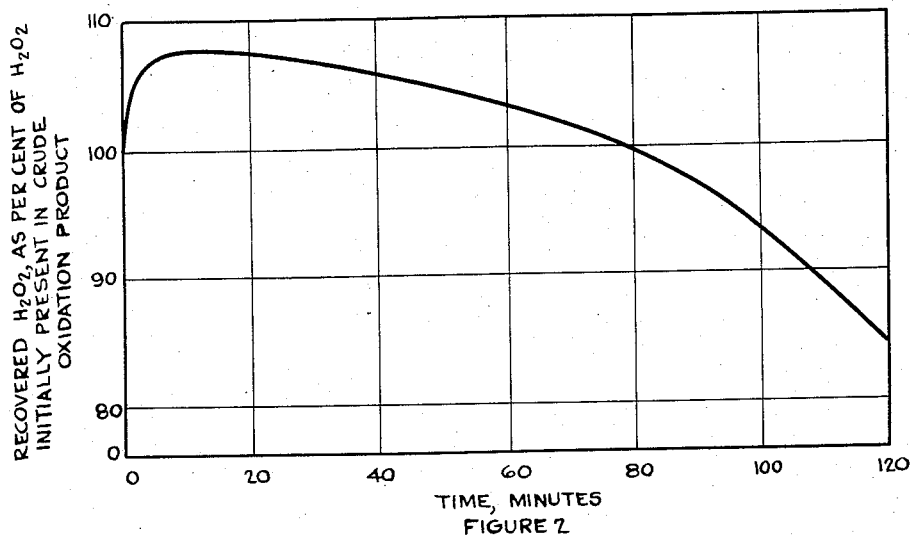

Figure 2 is a graph which illustrates the variation with time of heating of the total amount of recoverable hydrogen peroxide contained in the crude oxidation product expressed as percentage of the hydrogen peroxide initially present in the crude oxidation product.

From Figure 1 it will be seen that when the crude oxidation product containing combined per-oxygen is heated at about 100° C. there is an initial rapid decrease in the amount of combined per-oxygen. The content of combined per-oxygen is shown to have decreased after about 15 minutes heating to about 10% of the initial content thereof, while the content of combined per-oxygen after about one hour's heating is shown to have fallen to about 2% of the initial content thereof.

From a comparison of Figure 1 with Figure 2, it is seen that the decrease in the content of combined per-oxygen of the crude oxidation product containing hydrogen peroxide and combined per-oxygen is accompanied by an increase in the amount of recoverable hydrogen peroxide within certain critical limits of time. Thus, after about 5 minutes heating the amount of recoverable hydrogen peroxide has increased to about 108% of the amount of hydrogen peroxide initially contained in the crude oxidation product. Between about 10 minutes and about 30 minutes there is relatively little further change in the amount of recoverable hydrogen peroxide. From about 30 minutes the amount of recoverable hydrogen peroxide falls off with increasing rapidity until after about 80 minutes less hydrogen peroxide is recoverable than was initially present in the crude oxidation product.

To obtain the benefits of this invention, advantage is taken of the applicants' discovery that the crude oxidation products of lower secondary aliphatic alcohols prepared according to the aforesaid processes for partial oxidation of secondary alcohols may contain, depending inter alia upon the particular conditions under which they were prepared, appreciable amounts of combined per-oxygen, and of the applicants' discovery that such combined per-oxygen can be selectively converted to recoverable hydrogen peroxide. The discovery that combined per-oxygen present in such crude oxidation products, including ketone peroxides and polymeric ketone peroxides, can be selectively converted by heating so as to give increased yields of hydrogen peroxide was a wholly unexpected discovery that in the applicants' opinion could not have been foreseen. Rather, the stability of the combined per-oxygen, as evidenced by the inertness thereof with respect to lime, clearly indicated it to be most improbable that selective conversion thereof to recoverable hydrogen peroxide could be achieved.

In practicing the method of this invention the crude oxidation product of a lower secondary aliphatic alcohol, containing hydrogen peroxide and combined per-oxygen, advantageously is subjected to a continuous fractional distillation under substantially constant conditions of liquid equilibria in a fractionating column of practical size, including a rectification zone, a stripping zone below the rectification zone for countercurrent contact with boiling and refluxing of liquid product and vapors evolved therefrom. The method involves operation under critical, correlated, controlled conditions of ($a$) pressure (or temperature) within the column and ($b$) residence time within the column of the liquid product passing through the column. While in the column, combined per-oxygen contained in the feed to the column is converted in large part, i. e., substantially wholly to hydrogen peroxide. A vaporous fraction comprising secondary alcohol, ketone, and water is continuously withdrawn from a point near the top of the column, and liquid aqueous product containing the hydrogen peroxide and greatly reduced and for many purposes negligible content, if any, of combined per-oxygen and of other organic materials is continuously withdrawn from a point near the bottom of the column.

The feed to the column should contain an amount of water such that the liquid bottoms product from the column contains from about 5% to about 35% by weight, preferably from about 10% to about 30% by weight, of hydrogen peroxide. Generally speaking, the crude oxidation products of lower secondary aliphatic alcohols with which this invention is concerned contain from 30% to 80% by weight of unconsumed alcohol, from about 1% to 30% water, from about 5% to 15% of active oxygen expressed as hydrogen peroxide and an amount of by-product ketone substantially equivalent to the amount of hydrogen peroxide present. Additional amounts of ketone are bound in the form of combined per-oxygen, i. e., ketone peroxides and polymeric ketone peroxides. Small amounts, usually less than 0.5% by weight, of other oxygenated compounds, such as acids, aldehydes, etc. may also be present. Since the lower secondary alcohols which are oxidized to form the oxidation products with which this invention is concerned form azeotropic mixtures with water, this means that there must be sufficient water in the feed to the column to supply the water required for the minimum-boiling water-azeotrope of the alcohol contained in the feed and, in addition thereto, an amount of water equal to from 19 to 1.85, respectively, and preferably equal to from 9 to 2.34, respectively, times the weight of the active oxygen, expressed as hydrogen peroxide, in the feed to the column. Typical feeds to the column will contain from about 20% by weight of water up to about 60% by weight of water. The crude oxidation product, if it contains insufficient water to meet the above requirements, should be diluted with water prior to its introduction into the column, the necessary amount of diluent water being readily calculable in each particular case from the amounts of secondary alcohol, active oxygen, and water in the crude oxidation product and the compositions of the vaporous overhead fraction and the liquid bottoms product to be withdrawn from the column.

The feed to the column ordinarily is introduced into the column in liquid state. The temperature of the feed to the column preferably is adjusted close to the temperature of the liquid on the feed plate. It may, if desired, be introduced at a temperature somewhat below the temperature on the feed plate, however, thereby to absorb heat in warming the feed and to regulate the internal reflux at or near the feed plate. The preheated feed may also be introduced into the column partially or wholly in the vapor state. For example, it may be desired to rid the feed of any trace of metallic contaminants prior to introduction of the feed into the column. This may be done by flash evaporating the feed and conveying the flashed crude oxidation product into the column wholly or in part in vapor state.

The feed to the column, that is, the crude oxidation product of the secondary alcohol containing the requisite amount of water, and hydrogen peroxide and substantial amounts of combined per-oxygen, i. e., from about 5% to about 50% of the active oxygen being present as combined per-oxygen, is introduced continuously into the column at a point intermediate along the length thereof. A liquid portion of the feed to the column descends through the column in countercurrent contact with ascending vapors evolved from the descending liquid portion under conditions of refluxing and reboiling. Secondary alcohol and ketone are stripped or distilled from the descending liquid portion of the feed. At the same time the combined per-oxygen is selectively converted to active oxygen which is in a form available for reaction with lime, i. e., to hydrogen peroxide, and volatile organic materials resulting from such conversion are distilled out as formed. The descending liquid accumulates at the lower end of the column, from which it is continuously withdrawn as the desired aqueous solution of hydrogen peroxide. Heat is supplied to the column sufficient to maintain continuous distillation throughout by maintaining a small quantity of this accumulated solution of hydrogen peroxide at boiling, as in the lower end of the column or in a separate reboiler in connection therewith, and introducing the vapors evolved from the boiling solution into the column near the lower end thereof.

Volatile materials which otherwise would be carried overhead in the vaporous fraction from the column are retained by passing the vapors from the stripping zone upwardly through the rectification zone in countercurrent flow and in substantial vapor-liquid equilibria with boiling liquid reflux. The liquid reflux is provided by liquid condensate descending from higher levels in the column. Volatile materials which, at lower operating pressures or in the absence of the rectification provided by the rectification zone, would pass overhead in the vaporous fraction withdrawn from the column, thereby are retained in the column. These volatile materials include volatile combined per-oxygen, which is retained in the column and converted therein to less volatile, available hydrogen peroxide. In addition to the internal reflux, external reflux desirably is provided. This is most conveniently done by returning a portion of the condensed vaporous overhead fraction to the upper end of the fractionating zone. Reflux ratios of at least about 0.2 (ratio of volume of condensed overhead fraction returned to volume of product withdrawn) desirably are employed; higher reflux ratios, up to 4 or more can be used.

The pressure within the column must be adjusted to levels within a critical range in order to obtain effective exclusion of volatile organic per-oxygen from the fraction which is withdrawn as the vaporous overhead from the column and, on the other hand, temperatures within the column favorable to the selective conversion of the organic per-oxygen to recoverable active oxygen. Pressures (measured at the top of the column) within the range of 400 to 700 millimeters of mercury are employed, depending upon the particular feed to the column, the residence time, and the desired concentration of hydrogen peroxide in the liquid product withdrawn from the bottom of the column. The volatilities and stabilities of the organic per-oxygen components have been found to be such that at lower pressures than about 400 millimeters of mercury appreciable quantities of active oxygen tend to be carried over into the overhead fraction. On the other hand, at pressures materially above 700 millimeters of mercury the necessary high distillation temperatures lead to excessive loss of hydrogen peroxide by decomposition or reaction with the organic materials which are present within the column. When the secondary alcohol is the preferred isopropyl alcohol, pressures of from about 550 to about 700 millimeters of mercury are particularly desirable. Since in columns of practical size there is a moderate positive pressure differential between the top and the bottom of the column, the pressure at the bottom of the column will ordinarily be, say, from 25 to 75 millimeters higher than the pressure at the top of the column. When we refer herein and in the appended claims to the pressure within the column, we refer to the pressure measured at the top of the column. The temperatures within the column will vary within limits according to the pressure and the particular feed being processed and may vary from a minimum temperature, measured at the top of the column, equal to about 55° C. to a maximum temperature, measured at the bottom of the column, equal to about 120° C. depending upon the pressure and the particular feed to the column. The temperature of the boiling aqueous solution of hydrogen peroxide in the reboiler section of the column will depend upon the concentration of the solution as well as upon the pressure upon the solution. The column should be operated at pressures and concentrations of hydrogen peroxide in the reboiler such that the solution of hydrogen peroxide in the reboiler boils at not less than 85° C. and not over about 120° C., and preferably in the range of 90° C. to 105° C.

During the progression of the liquid portion of the feed to the column downwardly through the stripping zone of the column, ketone and unconsumed secondary alcohol are stripped therefrom and conveyed with the upwardly flowing vapors into the rectification zone of the column. At the same time, combined per-oxygen in the descending liquid portion of the feed is converted. Volatile organic materials formed in or by such conversion of the combined per-oxygen are stripped by the ascending vapors from the liquid as rapidly as they are formed therein while hydrogen peroxide liberated by or in the conversion, being less volatile, passes downwardly through the column into the accumulated liquid in the bottom of the column or in the reboiler. In the rectification zone, active oxygen, including volatile combined per-oxygen, is stripped from the ascending vapors by the liquid reflux. Other oxygenated products, such as traces of organic acids, higher-boiling ketones, traces of aldehydes, etc., are also stripped from the ascending vapors and returned to the column. Per-oxygen compounds having volatilities close to the volatilities of such organic acids, higher-boiling ketones, aldehydes, etc., thus are retained in the column wherein they also are converted to recoverable active oxygen. By regulating the rate of feed of the crude oxidation product into the column so as to provide a residence time of the crude oxidation product in the column within definite critical limits, the course of these conversions and separations occurring within the column is so controlled that substantially quantitative recovery as hydrogen peroxide of the active oxygen (peroxy oxygen) in the feed to the column is obtained. The residence time may be defined as being equal to the quotient of the volume of the liquid holdup in the column (including the reboiler) divided by the rate of introduction of liquid feed into the column, consistent units naturally being used. The residence time, which for optimum yields of hydrogen peroxide depends to a certain extent upon the particular feed to the column and upon the temperatures in the reboiling and stripping sections of the column, should not exceed 100 minutes. Residence times within the range of 10 minutes to 30 minutes are generally optimum. Crude products from the partial oxidation of isopropyl alcohol containing between 10% and 40% of the total active oxygen in the form of combined per-oxygen, the balance being hydrogen peroxide, have been treated according to this invention at pressures within the column between 550 and 675 millimeters of mercury and at residence times between 10 and 30 minutes to obtain recoveries of hydrogen peroxide as high as 97% to 99% of the total active oxygen in the feed to the column, representing yields of hydrogen peroxide based upon the amount of hydrogen peroxide in the feed to the column substantially in excess of 100%.

Although according to the preferred embodiment of the invention the conversion of the combined per-oxygen contained in the crude oxidation product of the secondary alcohol to hydrogen peroxide by heating and the rectification to recover an aqueous solution of hydrogen peroxide and the unconsumed secondary alcohol and by-product ketone are carried out simultaneously as hereinbefore described, we may in certain cases effect partial conversion of the combined per-oxygen to hydrogen peroxide in a separate, preliminary step and further convert the remaining combined per-oxygen by continuous rectification of the resulting mixture. For example, we may heat the crude oxidation product in a time tank, heat exchanger, or other suitable vessel at temperatures between about 75° C. and about 120° C., preferably between about 85° C. and about 110° C., for times up to about an hour sufficient to effect partial conversion of the combined per-oxygen to hydrogen peroxide. The crude oxidation product containing the remaining portion of the combined per-oxygen, hydrogen peroxide, the secondary alcohol, the ketone, and water, then may be continuously introduced into the rectification column and subjected to continuous rectification under such conditions of time, temperature and pressure as hereinbefore and hereinafter described that the remaining portion of the combined per-oxygen is converted to hydrogen peroxide simultaneously with the rectification of the mixture to recover the alcohol, ketone, and aqueous hydrogen peroxide solution.

The aqueous solution of hydrogen peroxide which is obtained according to the method of the invention is a useful product and for many purposes it may be applied to the intended use without further purification and/or concentration. When it is desired to further purify and/or concentrate this solution, such purification and/or concentration may be carried out according to any of the suitable known methods. A preferred method is to treat the solution with a compound of a metal the peroxide of which is insoluble, such as a salt or oxide or hydroxide of calcium, strontium, barium, or zinc, to precipitate the peroxide of the metal. For example, the solution of hydrogen peroxide obtained as bottoms product from the column may be mixed with an aqueous slurry of lime to precipitate calcium peroxide, the suspension of calcium peroxide filtered, the precipitate washed, and hydrogen peroxide regenerated by acidification of the precipitate. Crude products of the partial oxidation of secondary alcohols containing, in addition to hydrogen peroxide, appreciable quantities of combined per-oxygen, yield appreciably greater quantities of hydrogen peroxide when fractionated according to the continuous method of this invention than when fractionated according to the methods heretofore employed.

In conjunction with or in lieu of precipitation of a metal peroxide, the hydrogen peroxide may be purified and/or concentrated by applicable distillatory techniques, including, without being limited to, evaporation and partial or fractional condensation, distillation and rectification, azeotropic distillation, stripping, and the like.

The overhead fraction withdrawn from the column usually is employed in recycling operations whereby the unconsumed alcohol is returned to the oxidation step for production of additional amounts of hydrogen peroxide and the ketone is hydrogenated to reconvert it to the secondary alcohol used as starting material. As one of the advantages of this invention, such recycling operations are greatly facilitated by virtue of the fact that the overhead fraction which is obtained according to the invention is free of volatile per-oxygen compounds which tend to deactivate, poison, or otherwise adversely affect the hydrogenation catalyst. The overhead product, or distillate, comprising the alcohol-water azeotrope and by-product ketone, may be conveyed directly to the hydrogenator wherein it is brought into contact with gaseous hydrogen and a hydrogenating catalyst under hydrogenating conditions, if desired with a preliminary fractionation to separate part or all of the alcohol from the ketone prior to the hydrogenation of the ketone. Effluent from the hydrogenator may be topped to recover unconverted ketone for recycling to the hydrogenator. The secondary alcohol may be recycled from the topping operation to the oxidation step with make-up feed.

The invention may be further illustrated by its application to a continuous process for the production of hydrogen peroxide in accordance with the flow diagram which is shown in Figure 3 of the attached drawings. In this flow diagram, which is drawn to no scale, pumps, valves, heat-exchange arrangements and other accessories which can be supplied by those skilled in the art have been omitted.

In the process illustrated in Figure 3, the lower secondary alcohol, e. g., isopropyl alcohol, containing a small amount, e. g., up to about 500 parts per million of an added sequestrative stabilizer for hydrogen peroxide, such as potassium pyrophosphate, is charged to reactor 1 via inlet 2. To the initial charge of the alcohol there is added a small amount, for example, about 1% by weight of hydrogen peroxide or of an organic peroxide, such as di-tertiary-butyl peroxide. The alcohol is treated with a stream of gas containing molecular oxygen, for example air, introduced under pressure and in excess through inlet 3 into intimate and thorough contact with the liquid alcohol. Off-gases are vented via vent 4 and reflux condenser 5; the contents of the reactor are stirred via stirrer 6. The reaction temperature may be between about 100° C. and about 160° C., reaction temperatures of about 130° C. being highly suitable. While the feed of the secondary alcohol to the reactor is continued, and after steady-state conditions have been reached, oxidation product containing unconsumed alcohol, corresponding ketone, hydrogen peroxide and combined per-oxygen is withdrawn via conduit 7, cooled in heat-exchanger 8, and passed via conduit 9 to percolator 10. In the percolator the reactor effluent is contacted with a cation-exchange resin, such as an acid-treated sulfonated phenol-aldehyde synthetic cation-exchange resin of the types sold by Dow Chemical Company under the trade name Dow X–50 resin and by Rohm and Haas Company under the trade name Amberlite IR–100, or a cation-exchange resin containing carboxyl as the acid group, such as a salicyclic acid-phenol-aldehyde resin, to remove any traces of ions of heavy metals.

The resin-treated oxidation product is passed via conduit 11 to an intermediate level of column 12. In column 12 unconsumed secondary alcohol and by-product ketone are taken overhead and combined per-oxygen in the feed to the column is simultaneously and selectively converted to hydrogen peroxide, which is withdrawn in aqueous solution as bottoms product from the column via conduit 14. Depending upon the concentration of $H_2O_2$ desired in this product and the concentration of water in the oxidation product from reactor 1, diluent water may be added to the reaction product prior to the fractionation as via inlet 15.

Column 12 may be, for example, a column of conventional design equipped with, for example, bubble-plate, grid-tray, sieve plates or their equivalents. The column is provided with overhead condenser 16, reflux drum 17 and return line 18, and with reboiler 19 and return line 20. It should be designed for efficient separation of water and the alcohol-water azeotrope of the lower secondary aliphatic alcohol which is employed and, in addition, it must be adapted to operations at the pressures and for the residence times that are required in the fractionation step of this invention. The column should be constructed of, or at least lined with, a material which is inert with respect to hydrogen peroxide, such as glass, a ceramic, or a non-rusting metal such as tin, tantalum, certain stainless steels, or aluminum.

The feed to the column is continuously introduced at a rate such that the residence time of the liquid portion of the feed within the column is not over 100 minutes, and preferably is within the range of 10 to 30 minutes. The pressure within the column is maintained by vacuum pumps (not shown) within the range of 400 to 700 millimeters of mercury and is adjusted according to the concentration of water in the feed to the column and the desired concentration of hydrogen peroxide in the bottom fraction from the column. With some feeds to the column the concentration of polymeric organic peroxides in the feed and the volatility and solubility characteristics of the polymeric organic peroxides may be such that small amounts of a separate phase rich in organic peroxides may form on one or more plates of the column. In order to avoid possible violent decomposition of the organic peroxides in this separate phase, the separate phase may be withdrawn from the column at the plate or plates on which it accumulates by a suitable bleed line (not shown), by passing the down-coming liquid stream from that plate through a separating means located externally to the column and wherein accumulated polymeric peroxides are separated and withdrawn from the system, or by equivalent means.

Overhead product from column 12, consisting essentially of secondary alcohol-water azeotrope and ketone is continuously withdrawn and is passed to hydrogenator 21 via line 22, vaporizer 23 and line 22a. Hydrogen is introduced via line 24 and the hydrogenation reaction effected in the hydrogenator over a hydrogenating catalyst such as a nickel, iron, copper, cobalt, platinum, or other suitable hydrogenation catalyst. The catalyst thus desirably may be a supported nickel catalyst containing from 40% to 60% by weight of nickel supported on an inert mineral supporting material such as diatomaceous earth, silica, etc. The hydrogenation temperature may be, for example, between 25° C. and 150° C. and hydrogen pressures up to 5000 pounds per square inch may be used.

From hydrogenator 21 the reduced overhead product is passed via line 25, condenser 26, line 27, separator 28 and line 29, to column 30, which is equipped with reflux condenser 31, reflux drum 32, and reboiler 33. In column 30 any unconverted ketone in the effluent from separator 28 is separated overhead and is then recycled via conduit 34 to the hydrogenator. Recovered secondary alcohol may be recycled directly via line 35 to reactor 1, or, if desired, it may also be fractionated, for example, to remove part of the water associated therewith and thereby to obtain a less hydrous product for recycling or to remove trace contaminants, such as ions of heavy metals.

The following examples illustrate certain of the various specific embodiments of the invention. In the examples, parts and percentages are calculated by weight unless otherwise specified.

*Example 1*

A crude oxidation product was prepared by liquid-phase partial oxidation in the initial presence of about 2% by weight of added hydrogen peroxide of isopropyl alcohol containing 12.5% water and 10–20 parts per million of sodium pyrophosphate. The crude oxidation product analyzed on an anhydrous basis about 5.6% active oxygen expressed as hydrogen peroxide, about 45.8% isopropyl alcohol, about 11.9% acetone, and about 0.2% of other oxygenated organic compounds. Of the total amount of active oxygen, about 40% was present in a form non-reactive with lime when tested by the method hereinbefore described.

For fractionation of the crude oxidation product there was employed an all-glass column having 35 perforate plates and equipped with a Pyrex glass thermosyphon-type reboiler, overhead condenser, and a liquid dividing stillhead with a solenoid operated reflux ratio controller. The pressure in the column was maintained at 650 millimeters of mercury by a vacuum pump connected to the column through the overhead condenser. A continuous stream of the above crude oxidation product was introduced into the column at the twenty-fifth plate from the bottom of the column at a rate giving a residence time of the liquid feed in the column equal to 29 minutes. The reflux ratio was adjusted to 0.5 (reflux/product). As the distillation continued a mixture of isopropyl alcohol-water azeotrope and acetone was continuously withdrawn overhead and an approximately 15% aqueous solution of hydrogen peroxide was withdrawn from the bottom of the column. The temperature of the solution in the reboiler at this concentration and pressure was 101° C. The temperature at the top of the column was 74° C. Of the total active oxygen in the feed to the column 96.1% was recovered as hydrogen peroxide in the bottoms product from the column. The hydrogen peroxide recovered corresponded to a yield of 160% based upon the hydrogen peroxide contained in the feed to the column.

Although the invention has been described with particular reference to recovery of hydrogen peroxide from the crude oxidation products of isopropyl alcohol, it will be understood that the method of the invention may also be applied to treatment of crude products, containing hydrogen peroxide and combined per-oxygen, produced by partial oxidation of other lower secondary alcohols, such as s-butyl alcohol and s-amyl alcohols, which form aqueous azeotropes having boiling points below the boiling point of water under equal pressures. It also will be understood that the invention is not limited to the specific apparatus described herein. For example, whereas the rectification zone and stripping zone have been shown to be formed by separate portions of a single column, separate columns or shells may be desirable in the construction of equipment designed for use on a practical scale. Since various specific embodiments of the invention are possible it will be appreciated that we intend to claim the invention in letter and spirit as broadly as the prior art permits.

We claim as our invention:

1. A process for recovering an aqueous solution of hydrogen peroxide from a crude product of partial oxidation of a lower secondary aliphatic alcohol, said product containing hydrogen peroxide, unconsumed lower secondary aliphatic alcohol, corresponding ketone, and small but appreciable amounts of other oxygenated organic materials, said other oxygenated organic materials including combined per-oxygen in amounts ranging from about 5% to about 50% of the total amount of active oxygen contained in said product and the total content of active oxygen being at least about 5% by weight of the product, which process comprises introducing an aqueous stream of said product into an upper portion of a fractionating column comprising a stripping zone wherein there is maintained an absolute pressure within the range of from about 400 to about 700 millimeters of mercury so that a liquid portion of the aqueous stream flows downwardly through the stripping zone in substantial vapor-liquid equilibria with ascending vapors evolved therefrom under constant conditions of refluxing and reboiling, continuously withdrawing a vaporous mixture of the lower secondary aliphatic alcohol, the corresponding ketone, and water overhead from said zone, continuously withdrawing aqueous solution of hydrogen peroxide from a bottom part of said zone, and adjusting the rates of introduction of feed to said zone and the rates of withdrawal of said vaporous mixture and said aqueous solution from said zone so as to provide a substantially constant residence time within the stripping zone of the descending liquid portion of the feed of from about 10 to not over 80 minutes.

2. The process according to claim 1 in which the lower secondary aliphatic alcohol is isopropyl alcohol and the corresponding ketone is acetone.

3. A process for recovering an aqueous solution of hydrogen peroxide from a crude aqueous product of partial oxidation of isopropyl alcohol, said product containing isopropyl alcohol, acetone, from about 5% to about 15% by weight of active oxygen expressed as hydrogen peroxide, and small but appreciable amounts of oxygenated organic compounds including combined per-oxygen in amounts ranging from about 5% to about 50% of the total amount of active oxygen contained in said product, which process comprises introducing a continuous stream of said product and water into a fractionating column comprising a stripping zone and a rectification zone, continuously flowing a liquid portion of said aqueous product downwardly through the stripping zone countercurrently in contact with vapors evolved therefrom under constant conditions of refluxing and reboiling under a pressure maintained within the range of from 550 millimeters of mercury to 700 millimeters of mercury, conveying vapors from an upper portion of said stripping zone upwardly through the rectifying zone in countercurrent flow to descending liquid reflux condensed from said vapors under constant conditions of refluxing and reboiling, flowing liquid reflux from a bottom part of said rectifying zone downwardly through said stripping zone in admixture with said liquid portion of said aqueous product, continuously withdrawing a vaporous mixture of isopropyl alcohol, acetone, and water overhead from an upper part of said rectifying zone, continuously withdrawing an aqueous solution of hydrogen peroxide from a bottom part of said stripping zone, and adjusting the rates of introduction of feed and withdrawal of said vaporous mixture and said aqueous solution so that the residence time in the stripping zone of said liquid portion of said aqueous product is within the range of from 10 minutes to 30 minutes.

4. In a process for the recovery of hydrogen peroxide from crude oxidation product produced by partial oxidation of a lower secondary aliphatic alcohol wherein the crude oxidation product contains lower secondary aliphatic alcohol, the ketone corresponding thereto, from about 5% to about 15% by weight of active oxygen expressed as hydrogen peroxide and including combined per-oxygen in an amount from about 5% to about 50% of the total content of active oxygen in the crude product, the steps which comprise subjecting the crude aqueous product to continuous fractional distillation under an absolute pressure within the range of from 400 to 700 millimeters of mercury with a residence time of the distilland in the distillation zone of from about 10 to not over 80 minutes and separating as distillate a vaporous mixture of said lower secondary aliphatic alcohol, the ketone corresponding to said alcohol, and water and as bottoms product an aqueous solution of hydrogen peroxide.

5. In a process for the recovery of hydrogen peroxide from crude oxidation product produced by partial oxidation of isopropyl alcohol wherein the crude oxidation product contains isopropyl alcohol, acetone, from about 5% to about 15% by weight of active oxygen expressed as hydrogen peroxide including organic per-oxygen in an amount from about 5% to about 50% of the total amount of active oxygen in the crude product, the steps which comprise introducing the crude oxidation product into a fractionating zone and subjecting it therein to continuous fractional distillation under an absolute pressure of from about 550 to about 700 millimeters of mercury with a residence time of the distilland in the distillation zone between 10 minutes and 30 minutes and continuously separating as distillate a vaporous mixture of isopropyl alcohol, acetone, and water and as bottoms product an aqueous solution of hydrogen peroxide.

6. In a cyclic process for the production of hydrogen peroxide which comprises partially oxidizing in an oxidation zone by treatment with molecular oxygen a lower secondary aliphatic alcohol having from 3 to 5 carbon atoms, inclusive, to produce a crude oxidation product comprising unconsumed alcohol, corresponding ketone, active oxygen in an amount at least about 5% by weight of the crude oxidation product expressed as hydrogen peroxide, and combined per-oxygen in amounts equivalent to from about 5% to about 50% by weight of the total content of active oxygen in said crude product, the steps: continuously fractionating the crude oxidation product in the presence of water in a fractionating zone discrete from the oxidation zone maintained at pressures between 400 and 700 millimeters of mercury at a residence time of the distilland in the fractionating zone between about 10 and 80 minutes so as to obtain a separated first distillate fraction consisting essentially of said unconsumed secondary alcohol, corresponding ketone, and water and as separated first bottoms fraction an aqueous solution of hydrogen peroxide, withdrawing said distillate fraction and said bottoms fraction from the fractionation zone, hydrogenating the distillate fraction by reaction with hydrogen in a hydrogenation zone in the presence of a hydrogenating catalyst under hydrogenating conditions, fractionally distilling the effluent from the hydrogenation zone so as to obtain a second distillate fraction consisting essentially of unconverted ketone and a second bottoms fraction containing substantially said secondary alcohol, recycling said second distillate fraction to the hydrogenation zone, and recycling said secondary alcohol from said second bottoms fraction to the oxidation zone.

7. A continuous cyclic process according to claim 6 in which the secondary alcohol is isopropyl alcohol and the corresponding ketone is acetone.

8. A process for recovering an aqueous solution of hydrogen peroxide from a crude aqueous product of partial oxidation of the lower secondary alcohol, said product containing from about 5% to about 15% by weight of active oxygen expressed as hydrogen peroxide, water, unconsumed lower secondary alcohol, corresponding ketone, and oxygenated organic materials including combined per-oxygen in amounts ranging from about 5% to about 50% of the total amount of active oxygen contained in said product, which comprises heating the crude aqueous product in liquid phase at a temperature within the range of from about 75° C. and about 120° C. for a time of at least 10 minutes sufficient to effect partial conversion of the combined per-oxygen to hydrogen peroxide, thereafter continuously introducing the crude aqueous product into an upper portion of a fractionating column comprising a stripping zone wherein there is maintained an absolute pressure within the range of from about 400 to about 700 millimeters of mercury, flowing a liquid portion of the crude aqueous product downwardly through said stripping zone in substantial vapor-liquid equilibria with ascending vapors evolved therefrom under constant conditions of refluxing and reboiling, continuously withdrawing a vaporous mixture of the lower secondary alcohol, the corresponding ketone, and water overhead from said zone, continuously withdrawing aqueous solution of hydrogen peroxide from a bottom part of said zone, adjusting the duration of said heating and the residence time of said liquid portion within said stripping zone to a total time of not over 80 minutes.

9. In a process for recovering an aqueous solution of hydrogen peroxide from a crude product of partial oxidation of isopropyl alcohol, said product containing hydrogen peroxide, isopropyl alcohol, acetone, water, and small but appreciable amounts of other oxygenated organic materials, said other oxygenated organic materials including combined per-oxygen in amounts ranging from about 5% to about 50% of the total amount of active oxygen contained in said product, the steps which comprise heating the crude product of the oxidation in a separate heat-treating zone at a temperature within the range of from about 75° C. to about 120° C. for a time of about 10 minutes to one hour at which partial conversion of combined per-oxygen compounds to hydrogen peroxide is effected, and thereafter introducing the heat-treated product into a fractionating zone and therein subjecting it to continuous fractional distillation in the presence of water under an absolute pressure within the range of from 550 to 700 millimeters of mercury and regulating the duration of said heating and the residence time of the distilland within the fractionating zone to a total residence time not greater than 80 minutes.

References Cited in the file of this patent

UNITED STATES PATENTS

| | | |
|---|---|---|
| 2,456,683 | Deansley | Dec. 21, 1948 |
| 2,479,111 | Harris | Aug. 16, 1949 |

OTHER REFERENCES

Richter: "Textbook of Organic Chemistry," 1938, pages 96–97.